Nov. 3, 1925.    E. A. SNYDER ET AL    1,560,355
LAWN TRIMMER
Filed Nov. 10, 1924
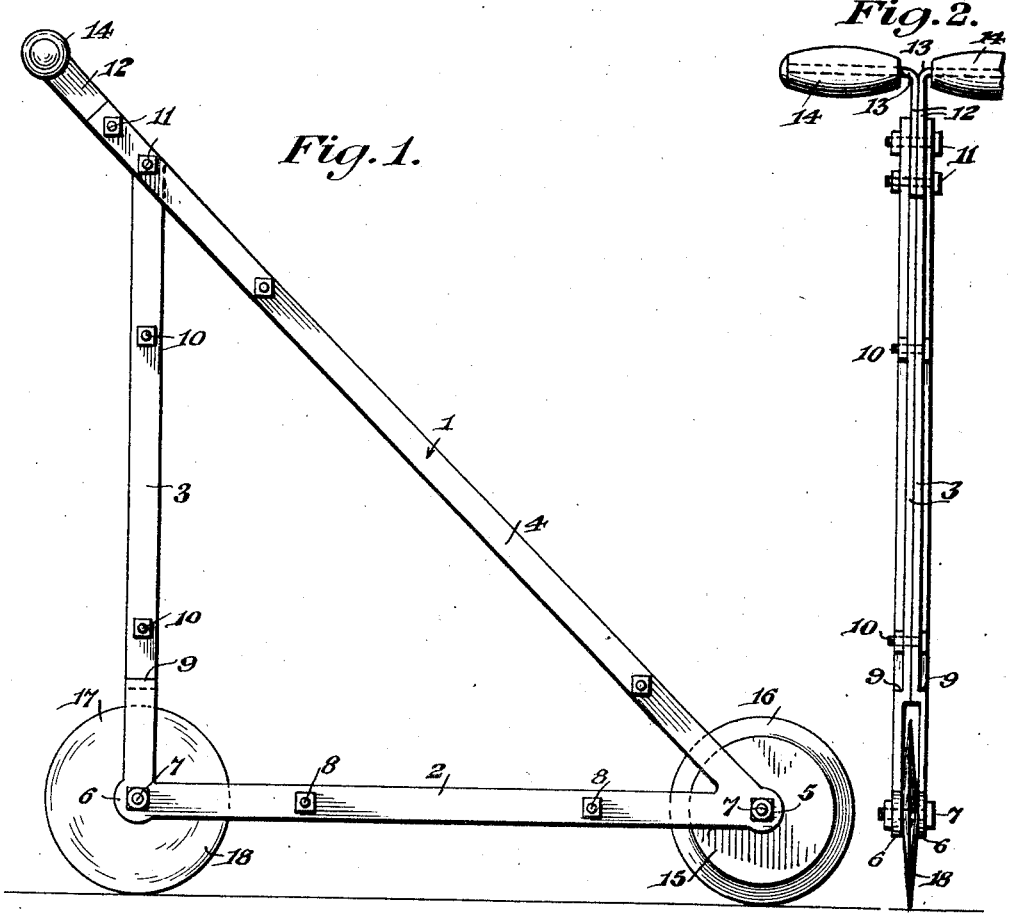
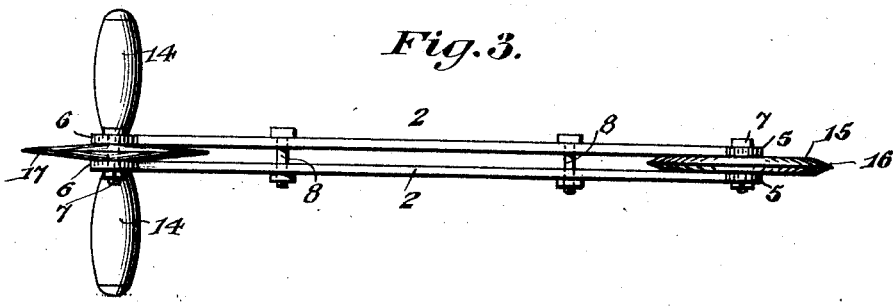
INVENTORS
E. A. Snyder
F. C. Andretta,
BY
Geo. F. Kimmel, ATTORNEY.

Patented Nov. 3, 1925.

1,560,355

UNITED STATES PATENT OFFICE.

EUGENE A. SNYDER AND FRED C. ANDRETTA, OF GREAT FALLS, MONTANA.

LAWN TRIMMER.

Application filed November 10, 1924. Serial No. 749,008.

*To all whom it may concern:*

Be it known that we, EUGENE A. SNYDER and FRED C. ANDRETTA, citizens of the United States, residing at Great Falls, in the county of Cascade and State of Montana, have invented certain new and useful Improvements in Lawn Trimmers, of which the following is a specification.

This invention relates to a lawn trimmer designed to trim long grass along the edge of a walk, gutter or curb.

The primary object of this invention is the provision, in a manner as hereinafter set forth, of a lawn edge trimmer, having a forward guide roller and a following, revolving cutting wheel, positioned in alignment and supported by a right triangular frame having a double controlling handle at the upper portion thereof above and slightly rearwardly of the cutting blade.

A final object of the invention is the provision, in a manner as hereinafter set forth, of a lawn edge trimmer of unique design, light in weight, strong and durable, easily handled and operated, and inexpensive to manufacture.

The invention will be best understood from a consideration of the following detailed description taken in connection with the accompanying drawing forming a part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1 is a side elevation of the device embodying this invention.

Figure 2 is a rear elevation of the same, and

Figure 3 is a bottom plan view of the same.

Referring to the drawings in detail, wherein like numerals of reference indicate corresponding parts throughout the several views, the device embodying this invention comprises an upright, right triangular frame, indicated as a whole by the numeral 1. This frame is formed in two parts, each part being identical in conformation, and each comprising a horizontal base portion 2 and a right angled vertically extending rear portion 3, with an upwardly and rearwardly inclined connecting portion 4, which connects the forward end of the base portion 2 with the upper end of the rear portion 3 as shown. At the angle formed between the inclined portion 4 and the base portion 2, and at the angle formed between the base portion 2 and the vertical back portion 3, there are formed enlargements 5 and 6 respectively, each having apertures therethrough and constituting hubs for axles 7 which connect the two parts of the frame.

The inclined portions 4, the base portions 2 and the lower part of the vertical back portion 3 are spaced apart, as shown in Figure 3, and held in this spaced relation by the bolt members 8. At the point 9, each of the vertical portions 3 is inset, as shown in Figure 2, and bolted together by means of the bolts 10 throughout the rest of their length.

The upper ends of the portions 3 of the frame are extended obliquely towards the rear of the frame, in alignment with and positioned between the upper ends of the portions 4, and further extend beyond the ends of the portions 4. Securing bolts 11 retain this oblique portion of the back of the frame members in position between the inclined portions 4.

The obliquely extending ends 12 of the portions 3 are bent at right angles to extend transversely of the frame structure, as indicated at 13, and these right angularly extending ends carry hand grips 14, by which the device is grasped by the operator.

Positioned between the hubs 5, at the forward part of the frame is a guide wheel 15, having the periphery bevelled, as at 16 to slightly cut into the ground to guide the device, and this guide wheel is adapted to follow a curbing or edge of a gutter for the proper positioning of the cutter.

Positioned between the hubs 6 at the back of the frame, is a revoluble cutting disk 17, which is mounted to revolve upon the bolt 7, and the cutting edge 18 of this disk follows the line made by the bevelled edge 16 of the side wheel 15, to cut the blades of grass which may be overhanging the curb of a walk or the side of a gutter.

From the foregoing description it will be seen that there is provided a lawn trimmer formed of a triangular frame constructed in two parts, these two parts being identical in shape and held in spaced relation by means of the bolts 8 throughout a portion of their opposed faces, and each of these triangular halves of the completed frame is preferably formed from a single piece of metal as shown, one end of one side portion of the frame being formed to provide hand grip supports. There is thus set up a lawn edge trimming device which can be moved along the edge of the lawn with ease, the handle of the device being so positioned that the operator can walk in an upright position at all times.

Having thus described our invention, what we claim is:

A lawn edge trimmer comprising an upright frame formed of two right triangular members arranged side by side in space relation, the upper portion of one side of each member being extended obliquely rearwardly of the frame, a guide wheel pivotally secured between said members at the forward part thereof, a cutting disk pivotally secured between said members at the rear part thereof, and hand grips carried upon said oblique portions for propelling the device.

In testimony whereof, we affix our signatures hereto.

EUGENE A. SNYDER.
FRED C. ANDRETTA.